United States Patent [19]
Ihara

[11] Patent Number: 5,625,853
[45] Date of Patent: Apr. 29, 1997

[54] MOUNTING DEVICE FOR MOUNTING A LENS BARREL TO A SUPPORT STRUCTURE AND HAVING MULTIPLE POSITIONS FOR CONNECTING TO THE SUPPORT STRUCTURE

[75] Inventor: Yuji Ihara, Tokyo, Japan

[73] Assignee: Nikon Corporation, Tokyo, Japan

[21] Appl. No.: 547,615

[22] Filed: Oct. 24, 1995

[30] Foreign Application Priority Data

Oct. 24, 1994 [JP] Japan .................................. 6-257773

[51] Int. Cl.⁶ .................................................. G03B 29/00
[52] U.S. Cl. ............................................ 396/419; 396/428
[58] Field of Search ............................. 354/81, 82, 293, 354/295; 352/243; 359/819, 827; 396/419, 428

[56] References Cited

U.S. PATENT DOCUMENTS

| | | | |
|---|---|---|---|
| 4,187,020 | 2/1980 | Ishii et al. ................................ | 354/293 |
| 4,249,817 | 2/1981 | Blau ......................................... | 354/293 |
| 4,572,612 | 2/1986 | Schlapp et al. ......................... | 354/293 |
| 5,055,864 | 10/1991 | Slikkers ................................... | 354/81 |
| 5,327,292 | 7/1994 | Eguchi ..................................... | 354/293 |

*Primary Examiner*—Safet Metjahic
*Assistant Examiner*—Eddie C. Lee

[57] ABSTRACT

A mounting device for mounting an optical device (for example, a lens barrel) on a support structure (for example, a tripod). The mounting device has a rotatable ring unit and a mounting seat integrally formed as a single unit, and allows the support structure to be attached to either the ring unit or the mounting seat. The ring unit is attached to the optical device and has a support member mounting device arranged thereon for connecting the ring unit to the support structure. The ring unit is rotatable to align the support member mounting device for connection to the support structure. The mounting seat extends from the ring unit and is integrally formed with the ring unit as a single component. The mounting seat has at least one support member mounting device arranged thereon for connecting the mounting seat to the support structure.

1 Claim, 2 Drawing Sheets

MOUNTING DEVICE FOR MOUNTING A LENS BARREL TO A SUPPORT STRUCTURE AND HAVING MULTIPLE POSITIONS FOR CONNECTING TO THE SUPPORT STRUCTURE

BACKGROUND OF THE INVENTION

1. Field of the Invention

The present invention relates to a mounting device for mounting a lens barrel of a camera on a support structure, such as a tripod or a monopod. More particularly, the present invention relates to a mounting device having a rotatable ring unit and a mounting seat integrally formed as a single unit, wherein the mounting device allows the support structure to be attached to either the ring unit or the mounting seat.

2. Description of the Related Art

In a camera having a relatively large lens barrel, a photographer typically mounts the lens barrel on a support structure to provide support for the lens barrel. The support structure can be, for example, a tripod or a monopod. The support structure provides stability to the camera and reduces the effect of vibrations on the camera. Thus, a support structure reduces the effect of image blur on a photograph resulting from, for example, hand tremor of the photographer.

A support structure is particularly effective in reducing image blur during photography with a heavy camera. For example, a telephoto lens is relatively heavy. Therefore, a telephoto lens is often equipped with a mounting device for mounting the telephoto lens on a support structure.

A conventional mounting device often includes a ring unit which supports the body of the lens barrel. The inner surface of the ring unit is arranged around the outside surface of the body of the lens barrel. A lens compartment holds a lens and is contained inside the body of the lens barrel. A mounting seat is connected to the ring unit via an arm. The mounting seat extends in the optical axis direction of the lens barrel. The arm causes a fixed space to exist between the mounting seat and the ring unit. A threaded hole is arranged in the mounting seat. When a photographer desires to use a support structure to take a photograph, a male thread (such as a screw) on the support structure is fit into the threaded hole of the mounting seat, to thereby mount the lens barrel on the support structure via the mounting seat. To transport the lens barrel, the photographer inserts his hand into the space between the mounting seat and the ring unit. In this type of mounting device, the mounting seat is connected directly to the support structure. The support structure cannot be connected directly to the ring unit. In addition, the lens barrel usually has a focusing ring which is rotated to focus the camera, and the mounting seat can become an obstruction when the photographer uses the focusing ring to focus the lens barrel.

A different type of mounting device has a ring unit, but does not include a mounting seat. Female threading is arranged directly in the ring unit. The ring unit can then be directly connected to the support structure, to mount the lens barrel on the support structure. This type of mounting device has an advantage in that it does not require a mounting seat. As previously mentioned, a mounting seat can become an obstruction when focusing the lens barrel via a focusing ring.

An additional type of mounting device has a ring unit and a mounting seat which is detachable from the ring unit. Female threading is arranged directly on the ring unit to connect the ring unit to the support structure. The mounting seat is attachable and detachable to the ring unit via screws on the mounting seat which fit into the female threading of the ring unit. The mounting seat can be attached to different positions on the ring unit. To perform photography, the photographer can detach the mounting seat from the ring unit, or attach the mounting seat to an appropriate position on the ring unit in accordance with the type of support structure being used. The mounting seat can then be attached to a support structure to mount the lens barrel on the support structure and provide support for the camera.

However, attachment and detachment of the mounting seat to and from the ring unit can be cumbersome and difficult to perform. Moreover, "play" can arise when the male screw of the mounting seat and the female threading of the ring unit are not accurately tightened together. This "play" is undesirable and can cause movement of the camera. Further, this "play" can cause contacting parts between the mounting seat and the ring unit to wear or break.

Further, the ring unit and the detachable mounting seat are two separate components. A number of required screws (for attaching the mounting seat to the ring unit) represent additional, separate components which increase the total number of separate components of the mounting device. Thus, a mounting device having a detachable mounting seat requires a relatively large number of separate components, thereby undesireably increasing the manufacturing costs and the number of steps in the manufacturing process.

SUMMARY OF THE INVENTION

Accordingly, it is an object of the present invention to provide a mounting device for a lens barrel, wherein the mounting device is easy to operate, provides excellent support for the lens barrel, has relatively low wear and breakage, and has relatively low manufacturing costs.

It is an additional object of the present invention to provide a mounting device having a rotatable ring unit and a mounting seat integrally formed as a single unit, wherein the mounting device allows the support structure to be attached to either the rotatable ring unit or the mounting seat.

Objects of the present invention are achieved by providing a mounting device for mounting an optical device on a support structure. The mounting device includes a rotatable ring unit and a mounting seat. The rotatable ring unit is attached to the optical device and has a support member mounting device arranged thereon for connecting the ring unit to the support structure. The ring unit is rotatable to align the support member mounting device for connection to the support structure. The mounting seat extends from the ring unit and is integrally formed with the ring unit as a single component. The mounting seat has at least one support member mounting device arranged thereon for connecting the mounting seat to the support structure. Either the ring unit or the mounting seat can be connected to the support structure to mount the optical device on the support structure.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
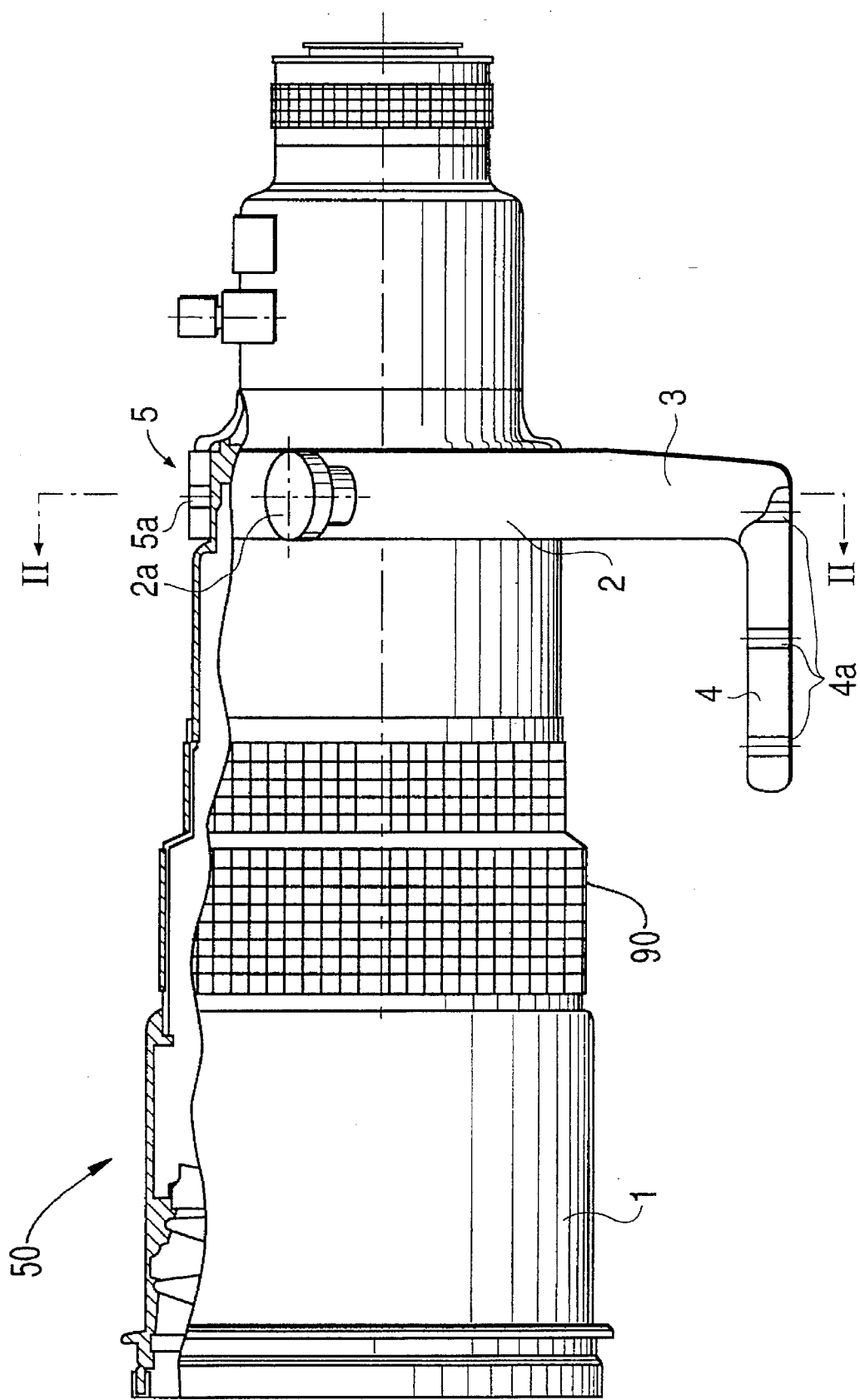
FIG. 1 is a side view of a lens barrel equipped with a mounting device, according to an embodiment of the present invention.

Reference will now be made in detail to the present preferred embodiments of the present invention, examples of which are illustrated in the accompanying drawings, wherein like reference numerals refer to like elements throughout.

Figure 2:
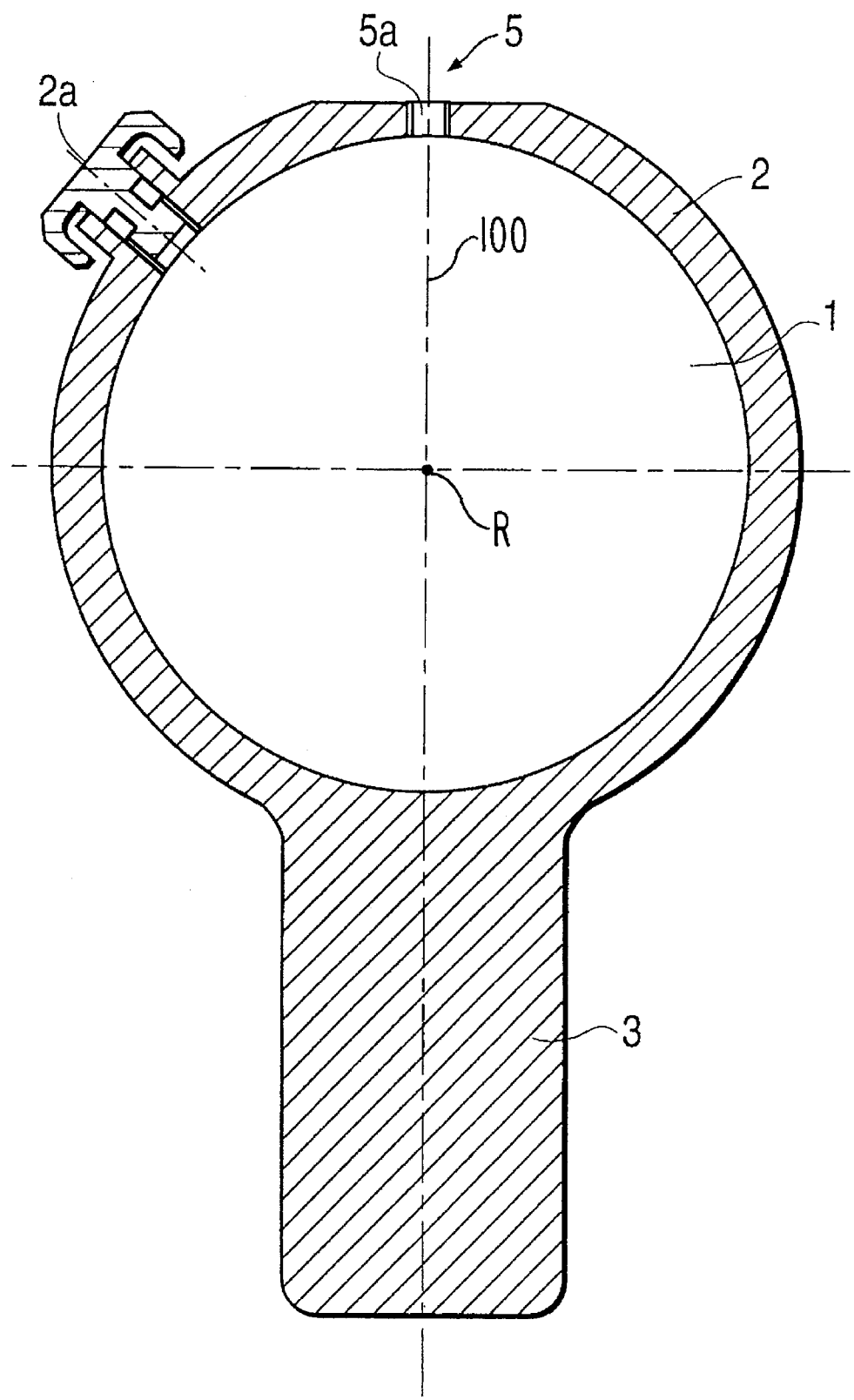
FIG. 2 is a cross section along lines II—II in FIG. 1, of a mounting device according to an embodiment of the present invention.

FIG. 1 is a side view of a lens barrel equipped with a mounting device, according to an embodiment of the present invention. FIG. 2 is a cross section along lines II—II in FIG. 1, of a mounting device according to an embodiment of the present invention.

Referring now to FIGS. 1 and 2, a lens barrel 50 has a barrel body 1 which internally contains a lens compartment (not illustrated) that holds a lens (not illustrated). Barrel body 1 has a focusing ring 90 thereon for focusing the lens. A ring unit 2 is rotatably fitted around barrel body 1, and can be rotated by a photographer. A stop 2a is arranged on ring unit 2 to maintain ring unit 2 at a fixed position on lens barrel 1. An arm 3 connects a mounting seat 4 to ring unit 2. As illustrated in FIG. 1, mounting seat 4 can be a foot-shaped member. Arm 3 has a fixed length. Ring unit 2, arm 3 and mounting seat 4 together form a mounting device. Ring unit 2 has a flat portion 5 arranged thereon. A female threaded hole 5a is arranged in the center of flat portion 5. Mounting seat 4 has multiple female threaded holes 4a.

Photography can be performed by mounting lens barrel 50 on a support structure (not illustrated), wherein the support structure is directly connected to mounting seat 4. The support structure can be, for example, a tripod, a monopod, or a similar structure to support lens barrel 50. To mount lens barrel 50 on the support structure via mounting seat 4, the photographer selects a respective female threaded hole from among female threaded holes 4a arranged in mounting seat 4. Preferably, the photographer selects a female threaded hole from among female threaded holes 4a which is closest to the center of gravity position of lens barrel 50. A male screw (not illustrated) on the support structure is then fit into the selected female threaded hole from among female threaded holes 4a, to connect mounting seat 4 to the support structure. In this manner, lens barrel 50 is mounted on the support structure via mounting seat 4.

Alternatively, lens barrel 50 can be mounted to a support structure (not illustrated) by connecting the support structure directly to ring unit 2. To mount lens barrel 50 on the support structure via ring unit 2, a male screw (not illustrated) on the support structure is inserted into female threaded hole 5a in flat portion 5. In this manner, lens barrel 50 is mounted on the support structure by directly connecting ring unit 2 to the support structure. Thus, lens barrel 50 can be mounted on the supporting structure without attaching the supporting structure to mounting seat 4. Flat portion 5 is preferably a surface having a sufficient width for directly connecting ring unit 2 to the support structure. Flat portion 5 is a flat surface on the outside surface of ring unit 2, and provides a flat surface to allow a stable connection to the support structure.

The following is a more detailed description of how a photograph would connect a support structure directly to flat portion 5 of ring unit 2. The photographer first detaches mounting seat 4 from any support structure which is connected thereto. The photographer then operates stop 2a to allow ring unit 2 to be rotated around barrel body 1. The photographer then rotates ring unit 2 to move flat portion 5 in the downwards direction of FIG. 1 to align flat portion 5 with a support structure positioned on the ground (for example, the earth's surface) so that flat portion 5 can be connected to the support structure. Of course, if the support structure is not on the ground, flat portion 5 might not be moved in the downwards direction and, instead, would simply be moved to align flat portion 5 for connection to the support structure. The photographer then operates stop 2a to maintain ring unit 2 at a fixed position in alignment for connection to the support structure. Thus, stop 2a is operated so that ring unit 2 does not rotate from the fixed position.

After ring unit 2 is maintained at a fixed position by stop 2a, the photographer inserts male screws (not illustrated) of the support structure into female threaded hole 5a of flat portion 5, thereby directly connecting the support structure to ring unit 2, with the support structure in surface contact with ring unit 2. In this manner, the mounting position of the lens barrel is changed from having mounting seat 4 directly connected to the support structure, to having ring unit 2 directly connected to the support structure. Connecting the support structure directly to ring unit 2 can provide added stability to lens barrel 50, as compared to having mounting seat 4 connected to the support structure.

Therefore, according to the above embodiments of the present invention, mounting seat 4 extends in the optical axis direction of lens barrel 50, and can be mounted to a support structure. Mounting seat 4 can be detached from the support structure. Then, stop 2a can be operated to allow ring unit 2 to be rotated. Ring unit 2 can then be rotated so that flat portion 5 is suitably arranged for connecting flat portion 5 to the support structure. Once flat portion 5 is suitably arranged, stop 2a can be operated to prevent ring unit 2 from rotating. The photographer can then connect flat portion 5 directly to the support structure, to mount lens barrel 50 on the support structure. Photography can then be performed with flat portion 5 directly connected to the support structure, instead of with mounting seat 4 directly connected to the support structure. Thus, the support structure can be attached to different positions on the mounting device, thereby allowing lens barrel 50 to be mounted to different types of support structures.

As illustrated in FIG. 2, ring unit 2 has a center position R indicating the center of the circular ring shape formed by ring unit 2. Flat portion 5 and arm 3 are arranged so that flat portion 3, center position R and arm 3 lie on the same line 100. Center position R is between flat portion 5 and arm 3. As a result of this positioning, the support structure can be on the ground and connected directly to flat portion 5. Therefore, mounting seat 4 will be at the top of the lens barrel so that focusing ring 90 can be operated from below without being obstructed by mounting seat 4. Thus, focusing ring 90 is easily rotated by the photographer.

According to the above embodiments of the present invention, it is possible to change the position on the mounting device to which the support structure is connected. The position can be changed by appropriately rotating ring unit 2. Therefore, the mounting position is relatively easy to change. Moreover, ring unit 2, arm 3 and mounting seat 4 are integrally formed as a single component, and are not adhered together by screws, threads or adhesives. Therefore, manufacturing of a mounting device according to the above embodiments of the present invention requires relatively few separate processes, and manufacturing costs are reduced in comparison with a conventional mounting device requiring two or more separate components. Furthermore, according to the above embodiments of the present invention, a single component (comprising ring unit 2, arm 3 and mounting seat 4) bears the load when the lens barrel is mounted on a support structure. This use of a single component to bear the load (as opposed to a conventional mounting device which uses two or more components to bear the load) increases the durability of the mounting device.

A mounting device according to the above embodiments of the present invention is described as including ring unit 3, mounting seat 4 and arm 3 connecting ring unit 3 to mounting seat 4. However, the mounting device can also be described as including a ring unit with a mounting seat extending therefrom. Thus, the mounting unit does not necessarily have to include an arm (such as arm 3), and a mounting seat can be directly connected to, or directly extending from, the ring unit.

According to the above embodiments of the present invention, female threaded holes 4a and 5a can be described as "support member mounting devices". Such support member mounting devices are not limited to be threaded holes. For example, the support member mounting devices can be screws, with female threaded holes being arranged in the support structure. Further, the support member mounting devices are not intended to be limited to screws or threaded holes, and can be virtually and securing arrangement for connecting the support structure to the mounting device.

According to the above embodiments of the present invention, a mounting device mounts a lens barrel on a support structure. The mounting device includes a rotatable ring unit having a center position and attached to the lens barrel. The ring unit has a flat portion and a support member mounting device positioned in the flat portion. The flat portion contacts the support structure and provides a flat surface for connecting the ring unit to the support structure when the ring unit is connected to the support structure. The ring unit is rotatable to align the support member mounting device for connection to the support structure. A mounting seat has at least one support member mounting device arranged thereon for connecting the mounting seat to the support structure. An arm connects the mounting seat to the ring unit. The flat portion of the ring unit, the center position of the ring unit and the arm lie on the same line with the center position between the flat portion and the arm. The arm, the mounting unit and the ring unit are integrally formed as a single component. Either the ring unit or the mounting seat can be connected to the support structure to mount the lens barrel on the support structure.

The present invention is described as relating to a lens barrel of a camera. However, the present invention is not intended to be limited to use with a camera. For example, the present invention can be used in many types of optical devices including, but not limited to, camcorders, motion picture cameras, telescopes, binoculars, microscopes, range finding equipment, lasers, fiber optic communication systems and various optical projection systems. Moreover, a mounting device according to the above embodiments of the present invention is not intended to be limited to mounting a lens barrel, and can be used to mount virtually any optical device. For example, a mounting device according to the above embodiments of the present invention can mount a camera to a support structure, instead of mounting a lens barrel of a camera to a support structure.

Moreover, the present invention is described as relating to a lens barrel. However, the present invention is not intended to be limited to a "barrel" shape. For example, the present invention is applicable to many types of lens holding devices having many different shapes. Thus, the term "lens barrel" is intended to broadly relate to a lens holding device.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mounting device for mounting a lens barrel on a support structure, comprising:

a rotatable ring unit having a center position and attached to the lens barrel, the ring unit including a flat portion, and a support member mounting device positioned in the flat portion so that the flat portion contacts the support structure and provides a flat surface for connecting the ring unit to the support structure when the ring unit is connected to the support structure, the ring unit being rotatable to align the support member mounting device for connection to the support structure;

a mounting seat having at least one support member mounting device arranged thereon for connecting the mounting seat to the support structure; and an arm which connects the mounting seat to the ring unit, where the arm, the mounting unit and the ring unit are integrally formed as a single component, and the flat portion of the ring unit, the center position of the ring unit and the arm lie on the same line with the center position between the flat portion and the arm, thereby allowing either the ring unit or the mounting seat to be connected to a support structure to mount the lens barrel on the support structure.

* * * * *